United States Patent Office 2,813,857
Patented Nov. 19, 1957

2,813,857

N-AMINOALKYLATED SUBSTITUTED IMINODI-BENZYL DERIVATIVES

Walter Schindler, Riehen, near Basel, and Franz Häfliger, Basel, Switzerland, assignors, by mesne assignments, to Geigy Chemical Corporation, New York, N. Y., a corporation of Delaware No Drawing. Application August 31, 1955,
Serial No. 531,817

Claims priority, application Switzerland
September 22, 1954

3 Claims. (Cl. 260—239)

The present invention is concerned with new basically alkylated, substituted iminodibenzyl derivatives which have valuable pharmacological properties and with the production thereof.

Derivatives of nuclear substituted iminodibenzyl have not been known up to now. It has been found that such compounds of the general formula:

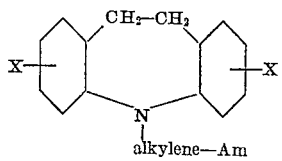

wherein alkylene represents an alkylene radical with 2–6 carbon atoms and 2–4 bridging members
Am represents a low molecular dialkylamino radical or an alkylenimino radical with 5–6 ring members, and
X represents a halogen atom have interesting pharmacological properties, in particular anti-allergic and sedative activity and can be used, among other things, for the treatment of certain forms of mental disorders.

Some quaternary ammonium salts which are derived from the tertiary bases defined above are effective as ganglioplegica.

The new compounds are produced by reacting an iminodibenzyl substituted as defined, in the presence of acid binding agents with a reactive ester of an alcohol of the general formula:

HO—alkylene—Am wherein alkylene and Am have the meanings given above. In particular, sodium amide, lithium amide, potassium amide, sodium or potassium are suitable as acid binding agents by means of which it is advantageous to convert the dihalogeno-iminodibenzyl into its alkali salt immediately before the reaction. The reaction is performed advantageously in an inert organic solvent such as, e. g. benzene, toluene or xylene while heating.

In particular the halides can be used as reactive esters of amino alcohols of the general formula:

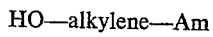
HO—alkylene—Am

The following can be named individually: dimethylaminoethyl chloride, diethylaminoethyl chloride, methylethylamino ethyl chloride, piperidinoethyl chloride, pyrrolidino ethyl chloride, morpholino ethyl chloride, β-dimethylamino propyl chloride, β-dimethylamino isopropyl chloride, γ-dimethylamino propyl chloride, δ-dimethylamino butyl chloride, α-methyl-γ-dimethylamino pentyl chloride, di-n-propylamino ethyl chloride, methyl isopropylamino ethyl chloride, di-isobutylamino ethyl chloride, di-n-butylamino ethyl chloride or the corresponding bromides or iodides. 3.7- or 1.9-dibromo-iminodibenzyl, 2.8-, 3.7- or 1.9-dichloro-iminodibenzyl, 3.7- or 2.8-dimethyl iminodibenzyl can be named as nuclear substituted iminodibenzyls.

The iminodibenzyls substituted as defined can be obtained, for example from the corresponding substituted diamino-dibenzyls by heating the diphosphates thereof or by heating with polyphosphoric acid. Thus, for example, 3.7-dichloro-iminodibenzyl is obtained from 2.2'-diamino-4.4'-dichloro-dibenzyl by heating with polyphosphoric acid at 220–300°.

Quaternary ammonium compounds result in the usual way from the tertiary aminoalkyl dihalogeno- or dimethyl-iminodibenzyls by the addition of halides or sulphates or aliphatic or araliphatic alcohols, e. g. of methyl iodide, dimethyl sulphate, ethyl bromide or benzyl chloride.

The tertiary bases form water soluble salts with inorganic or organic acids such as hydrochloric acid, hydrobromic acid, sulphuric acid, phosphoric acid, methane sulphonic acid, ethane disulphonic acid, acetic acid, citric acid, malic acid, succinic acid, tartaric acid, benzoic acid, phthalic acid.

The following examples serve to illustrate the invention; where not otherwise stated, parts are given as parts by weight and their relationship to parts by volume is as that of grammes to cubic centimetres. The temperatures are in degrees centigrade.

*Example 1*

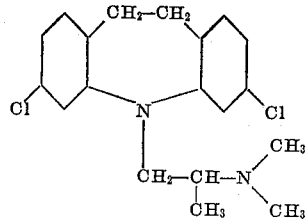

13.2 parts of 3.7-dichloro-iminodibenzyl are dissolved in 50 parts by volume of abs. benzene. 7 parts of β-dimethylamino propyl chloride in 50 parts by volume of abs. benzene are added, 2.1 parts of sodium amide in toluene are added dropwise within half an hour at 45–55°, the whole is then kept at this temperature for another 2 hours and finally boiled under reflux for 14 hours. The reaction mixture is cooled and shaken out with water. The benzene layer is then shaken out several times, each time with 20 parts by volume of 2 N-acetic acid. The reaction of the united acetic acid extracts is then made alkaline with concentrated ammonia and the base which precipitates is taken up in ether. The ethereal solution is washed with water, dried and evaporated. The residue is distilled in the high vacuum whereupon 5-(β-dimethylamino-propyl)-3.7-dichloro-iminodibenzyl, (5-(β-dimethylamino - propyl) - 3.7 - dichloro - 10.11 - dihydrodibenzo [B. F.] azepine) passes over at 173–175° under 0.004 mm. pressure. The hydrochloride which melts at 254° is obtained with alcoholic hydrochloric acid.

*Example 2*

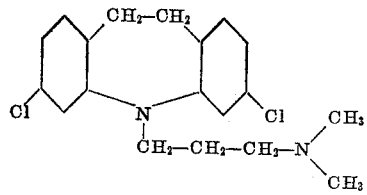

13.2 parts of 3.7-dichloro-iminodibenzyl are dissolved in 50 parts by volume of abs. benzene, a solution of 2.2 parts of sodium amide in toluene is added and the whole is boiled for one hour under reflux to form the sodium salt. The temperature is reduced to 50°, and a solution of 6.5 parts of γ-dimethylamino propyl chloride in abs. benzene is added while stirring. The whole is stirred for a further 2 hours at 50° and then boiled under reflux for 16 hours. The whole is filtered hot under suction through some charcoal and the filtration residue is thoroughly washed with hot benzene and the united benzene solutions are evaporated in the vacuum. The residue is distilled in the high vacuum. 5-(γ-dimethylamino-propyl)-3.7-dichloro-iminodibenzyl, (5-(γ-dimethylamino-propyl)-3.7-dichloro-10.11-dihydro-5-dibenzo [B. F.] azepine) passes over at 175–179° under 0.01 mm. pressure.

The hydrochloride prepared with alcoholic hydrochloric acid can be recrystallised from acetone. It then melts at 174–175°.

5-(β-piperidino-ethyl)-3.7-dichloro-iminodibenzyl, (5-(β - piperidino - ethyl) - 3.7 - dichloro - 10.11 - dihydro-5-dibenzo [B. F.] azepine) which boils at 191–193° under 0.007 mm. pressure is obtained in an analogous manner. The hydrochloride thereof melts at 238–240°. Also 5-(β-pyrrolidino-ethyl)-3.7-dibromoiminodibenzyl is obtained in the same way.

What we claim is:

1. A 5-dimethylaminopropyl - 3,7 - dichloro - iminodibenzyl.

2. 5 - (γ - dimethylamino - propyl) - 3,7 - dichloro-iminodibenzyl.

3. 5 - (β - dimethylamino - propyl) - 3.7 - dichloro-iminodibenzyl.

References Cited in the file of this patent
FOREIGN PATENTS
668,659   Great Britain _____ Mar. 19, 1952